Aug. 16, 1966
L. MACKTA
3,267,284
OPTIC WAVE MODULATION METHOD AND APPARATUS USING
A ROTATING DIFFRACTION GRATING
Filed Dec. 26, 1963
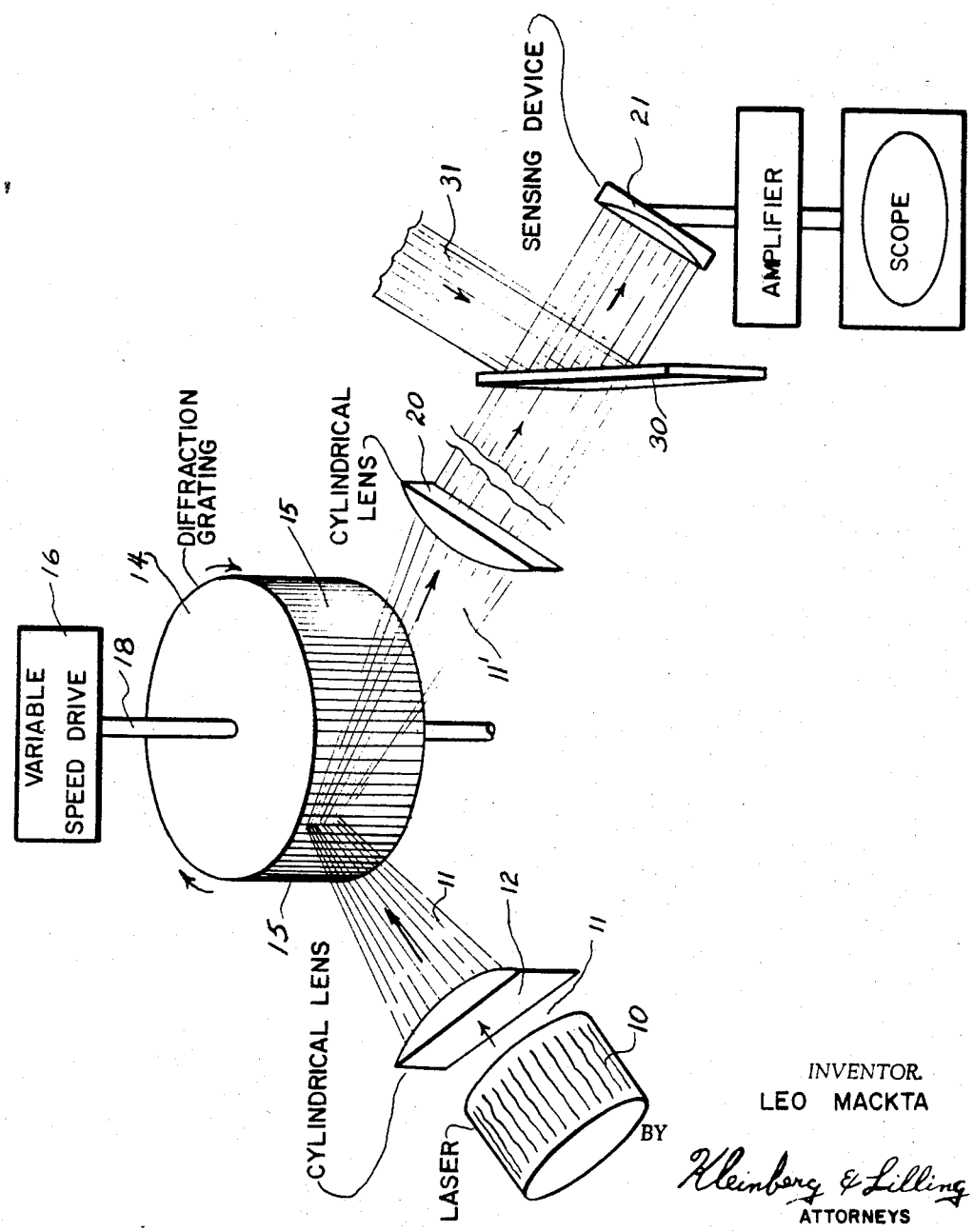
INVENTOR.
LEO MACKTA
BY
Kleinberg & Lilling
ATTORNEYS

United States Patent Office 3,267,284
Patented August 16, 1966

---

3,267,284
OPTIC WAVE MODULATION METHOD AND APPARATUS USING A ROTATING DIFFRACTION GRATING
Leo Mackta, 444 Beach 132nd St., Queens, N.Y.
Filed Dec. 26, 1963, Ser. No. 333,512
8 Claims. (Cl. 250—199)

This invention is concerned primarily with the transmission of light, and more particularly describes a method and apparatus for modulating and controlling the frequency of light waves.

The frequency modulation of beams of light has recently become of extreme interest in view of the development of the optical maser (laser).

Optical lasers in principle develop a monochromatic coherent beam of light. In such a device, energy from a pumping light excites atoms in an active material causing them to emit light which is reflected back and forth between two mirrors. This light in turn stimulates other atoms to emit light which is in phase or coherent with the existing light and thereby greatly increases its intensity. If one of the two mirrors is lightly silvered, the light within the active material will pass through and emerge as an intense beam of extremely small width. Additionally, the band width is extremely narrow.

The use of such a coherent and monochromatic beam of light for long range transmission is of special interest. One advantage is that such a beam will not be subject to background noise as is most microwave equipment in that materials at the usual temperatures do not produce significant light in the visible part of the spectrum. While it is true that light is generated by outside sources, only a tiny fraction of the same will be within the very narrow band width that is utilized by a laser.

The use of a laser for transmission of information is dependant upon having another monochromatic beam of a slightly different frequency with which to heterodyne or beat the incoming beams, as in the conventional superheterodyne radio receiver. This enables useful information in the received light beam to be recovered more easily.

A cardinal object of this invention, therefore, is to provide a means which will change the frequency, or apparent wave length of a transmitted laser beam.

Another primary object of the device described herein is to set forth an apparatus to accomplish the above.

A still further purpose of the method and means described herein is to frequency modulate a beam of light by utilizing a mechanical apparatus.

With these objects in view, the invention consists of the novel features of construction and arrangement of parts which will appear in the following specification and recited in the appended claims, reference being had to the accompanying drawing in which the same reference numerals indicate the same parts through the figure, and in which:

The figure is a primarily diagrammatic representation of one embodiment of the instant invention.

The operation of this invention is dependant upon the utilization of a diffraction grating embedded or engraved about the periphery of a rotatable cylinder. A diffraction grating consists of a series of very fine closely spaced and very narrow parallel reflecting surfaces upon a surface. When light is incident upon the grating at a definite angle, it will be reflected at another definite angle. For high dispersion, the parallel reflecting surfaces must be very fine and very close together, and for high resolving power, the total number of such surfaces must be large. Diffraction gratings having several thousand slits, or reflecting surfaces to the inch of width, are common. Further, in the usual grating the spaced lines are engraved into an aluminum or other suitable polished surface. The angle of dispersion of light from a diffraction grating will depend upon the wave length of the said light. The dispersion, however, will always take place in a plane perpendicular to the direction of the lines of the said grating.

The complete optical theory of the operation of a diffraction grating is somewhat complicated, but approximately depends on the interference of the transmitted light. For example, a plane monochromatic light wave, which is incident to the grating, will reach the slits or engraved lines thereof at different times. The delay in certain of the waves in reaching the grating will result in the monochromatic wave being reflected from the grating at an angle which will be dependant not only upon the incidence of the incoming beam but upon the wave length of the beam.

Referring now to the drawing, which is primarily diagrammatic, there is shown at 10 a laser for generating a beam of light which is to be frequency or wave length modulated. As was mentioned, heretofore, the said generated beam will be coherent and monochromatic. The generated laser light 11 is concentrated by a cylindrical lens 12 to cause all of the rays of the light to be incident upon the periphery of a cylinder 14 at the same angle. The said cylinder 14 will have the lines of a diffraction grating 15 engraved or otherwise formed about the periphery thereof in a direction perpendicular to that of the direction of rotation of the said cylinder 14. A controllable means 16 will be provided coupled to the cylinder 14 as by a shaft 18 to variably drive the cylinder 14 at any desired and variable speed of rotation.

The controllable means 16 may consist of any well known means. For example, it might consist of a variable drive and an electronic control circuit whereby the speed of the variable drive is automatically reset proportional to some input signal such as the frequency of a human voice, the signal from a computer, etc. Electronic components may be utilized for the entire of the circuit or only a fractional portion thereof. Although it will be somewhat difficult to vary the control means 16 and the speed thereof as desired, according to the input signal, there are well known means available for this purpose. Additionally, and only by way of example, the means may consist of a plurality of individual motors each rotating at a different predetermined speed. Each of the said motors may be connected in turn to the rotating cylinder as desired by a separate speed connecting solenoid (not illustrated) in response to the desired input signal.

Further, light responsive means may be utilized to vary the speed of rotation of the control means 16. Thus, a photoelectric cell sensing an input may vary the output in proportion to the intensity focused thereon.

As was set forth heretofore, a light wave reflected from a diffraction grating will be incident at a predetermined angle to the said grating. Therefore, the light 11' reflected from the diffraction grating 15 of the instant invention, will be reflected from the cylinder 14 as indicated by the drawing and may be focused by a cylindrical lens 20.

The diffracted laser beam 11 will then be directed over any desired distance so that by use of partially reflecting mirrors 30 and other conventional optical devices, it will be combined with another received laser beam 31, and the resultant heterodyne signal detected by an appropriate photoelectric device 21.

It is to be noted, however, that the parts described above are set forth merely for exemplary purposes and may be replaced by any conventional components for the same. What is important herein is only the method of modulating the laser beam 11 to a desired frequency beam 11'.

If the diffraction gating 15 were relatively stationary to the remainder of the apparatus, the frequency of the beam 11 would be identical to that of the reflected beam 11'. As was set forth above, however, the principle of the diffraction grating is dependant upon the difference in time for the various waves of a monochromatic beam of light to reach the said grating. It has been demonstrated as a result of the above, that if the grating is moved relative to the transmitted beam of light, there will be a resultant shift in the frequency of the reflected beam of light. Further, the shift of the frequency of the reflected beam of light will be proportional to the velocity of linear speed of the diffraction grating and inversely proportional to the wave length of the transmitted beam of light. In the case of a diffraction grating inscribed about the periphery of a cylinder or drum 14, as illustrated herein, the velocity of the diffraction grating will be proportional to the radius of the cylinder or drum and the speed of revolution of the said cylinder or drum 14. It will, therefore, be apparent that by altering the speed of rotation of the said drum 14, the wave length of the beam of light reflected from the diffraction grating 15 will be altered.

By way of example, and assuming a radius of the cylinder 14 of five centimeters, and assuming a speed of rotation of five hundred revolutions per second, and a wave length of light of $5 \times 10^{-5}$ centimeters, it will be apparent that the frequency of shift of the reflected light will be equal to $$\frac{2\pi \times 5 \times 500}{5 \times 10^{-5}} = 3 \times 10^8$$

cycles per second.

Thus, the direct effect upon the frequency of the reflected light by the speed of rotation of the drum 14 with the diffraction grating 15 thereon, will be apparent. It will further be apparent that merely by altering the speed of the rotating drum 14 by the means 16, the wave length or frequency of the reflected beam 11' may be easily altered.

There has, therefore, then been provided a mechanical device for modulating the frequency of a reflected light beam 11'. It will merely be necessary to variably control the speed of rotation of the said drum 14 in order to control the frequency or wave length of the said reflector beam 11'.

As was mentioned heretofore, such modulation may be utilized to effectively transmit useful information over a light beam.

It will be apparent that this above description represents a simplified embodiment of the invention for ease of explanation. Commercial applications it is contemplated will have additional embellishments. For example, it may be desirable to mount the cylindrical collecting lenses 12 and 20 upon rigid supports so that the same may be moved as desired to accommodate incident generated waves of varying frequencies.

As was mentioned heretofore, modulation, such as described herein, may be utilized effectively to aid in the transmission of useful information over a light beam or detect the information in a received beam.

Of course, additional embellishments may be added within the scope of this invention.

For example, it will be preferable if the first cylindrical focusing lens 12 be arranged to cause the rays 11 from the laser to be incident on the periphery of the diffraction cylinder 14 so that the angle between the said rays 11 and the tangent to the periphery of the cylinder 14 at all points should be equal. This may be accomplished by focusing the said rays 11 upon the center of the cylinder 14. The rays diffracted from the cylinder 14 will then be diverging as illustrated in the drawings, but the diverging rays will be collected and made substantially parallel by the second collecting cylindrical lens 20.

While there are above disclosed but a limited number of embodiments of the structure and product of the invention herein presented, it is possible to produce still other embodiments without departing from the inventive concept herein disclosed and it is desired, therefore, that only such limitations be imposed on the appended claims as are stated therein, or required by the prior art.

Having thus described my invention and illustrated its use, what I claim as new and desire to secure by Letters Patent is:

1. Apparatus for shifting the frequency of a monochromatic light source, comprising: means to converge a mono-chromatic light beam, a rotative cylindrical reflecting diffracting element to diffract said converge beam of light and means to collimate such diffracted beam, said converging means converging said mono-chromatic light beam so that the center of curvature of its wave front coincides with the radius of curvature of said cylindrical diffracting element.

2. Apparatus according to claim 1, in combination with means to generate said monochromatic light source.

3. Apparatus according to claim 1, further including means to continuously rotate said rotative cylindrical reflecting diffracting element and to vary and control its rate of rotation thereby to vary and control the amount of shift in the frequency of said monochromatic light beam.

4. Apparatus according to claim 1, wherein said converging means is a cylindrical lens.

5. Apparatus according to claim 1, wherein said collimating means is a cylindrical lens.

6. Apparatus according to claim 1 wherein said rotating cylindrical diffracting element is a continuously-rotating, variably controlled, peripheral reflecting diffraction grating.

7. Apparatus for shifting the frequency of a monochromatic light source, comprising: a laser for generating a beam of monochromatic light, a cylindrical lens for converging said beam of light, a rotating peripheral reflecting diffraction grating for diffracting said converged beam of light, a second cylindrical lens for collimating said converged and diffracted beam of light, and, sensing means to indicate any resultant shift in the frequency of said beam of monochromatic light.

8. Apparatus according to claim 7 further including means to continuously rotate said peripheral diffraction grating and to vary and control its rate of rotation thus to vary and control the amount of shift in the frequency of said monochromatic light beam.

References Cited by the Examiner

UNITED STATES PATENTS

| | | | |
|---|---|---|---|
| 2,423,254 | 7/1947 | Rettinger | 250—199 |
| 2,543,130 | 2/1951 | Robertson. | |
| 2,670,652 | 3/1954 | Sherman | 88—14 |
| 3,154,371 | 10/1964 | Johnson. | |

FOREIGN PATENTS 800,303   8/1958   Great Britain.

DAVID G. REDINBAUGH, *Primary Examiner.*

JOHN W. CALDWELL, *Examiner.*